United States Patent
Shen et al.

(10) Patent No.: US 12,462,088 B2
(45) Date of Patent: Nov. 4, 2025

(54) CHIP DESIGN VERIFICATION SYSTEM, CHIP DESIGN VERIFICATION METHOD, AND COMPUTER READABLE RECORDING MEDIA WITH STORED PROGRAM

(71) Applicant: REALTEK SEMICONDUCTOR CORP., Hsinchu (TW)

(72) Inventors: Xiang-Hua Shen, Suzhou (CN); Dong Qiu, Suzhou (CN); Zhong-Ying Yu, Suzhou (CN); Chun-Yi Zhou, Suzhou (CN)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 705 days.

(21) Appl. No.: 17/865,593

(22) Filed: Jul. 15, 2022

(65) Prior Publication Data

US 2023/0195994 A1 Jun. 22, 2023

(30) Foreign Application Priority Data

Dec. 20, 2021 (CN) .......................... 202111562327.4

(51) Int. Cl.
*G06F 30/398* (2020.01)
(52) U.S. Cl.
CPC ................................. *G06F 30/398* (2020.01)
(58) Field of Classification Search
CPC .......... G06F 21/79; G06F 30/20; G06F 11/25; G06F 11/263; G06F 11/2205; G06F 11/3688; G06F 2115/02; G06F 30/39; G06F 30/3323; G06F 2009/45583; G06F 12/08; G06F 12/0246; G06F 2221/033; G06F 2221/034; G06F 30/398; G06F 30/337; G06F 11/273; G06F 30/331; G06F 21/572; G06F 2212/402; G06F 8/654; G06F 3/0679; G06F 30/33; G06F 21/78; G06F 30/347; G06F 9/30098; G06F 11/1056;

(Continued)

(56) References Cited

U.S. PATENT DOCUMENTS

2015/0302126 A1* 10/2015 Hamid .................. G06F 3/0484
716/136
2017/0110206 A1* 4/2017 Ryu .................... G11C 29/4401

(Continued)

*Primary Examiner* — Binh C Tat
(74) *Attorney, Agent, or Firm* — Birch, Stewart, Kolasch & Birch, LLP

(57) ABSTRACT

A chip design verification system and method, and a computer readable recording medium with a stored program are provided for verifying a module under test. The chip design verification system is configured to: transmitting, by the driver module, the test data sets to the result verification module and performing, by the driver module, a write procedure to write the test data sets into the storage space modules; performing, by the module under test, an autoload function to load the test data sets stored in the storage space modules into the registers correspondingly; and reading, by the result verification module, a plurality of first readout values corresponding to the test data sets at the registers according to the location data of each of the test data sets and comparing, by the result verification module, the test data sets with the first readout values to determine whether the autoload function operates normally.

15 Claims, 11 Drawing Sheets

(58) Field of Classification Search
CPC ............... G06F 11/106; G06F 11/1028; G06F 11/3636; G06F 11/3648
USPC ................................................. 716/108–115
See application file for complete search history.

(56) References Cited

U.S. PATENT DOCUMENTS

2020/0356085 A1\* 11/2020 Wentz .................... H04L 9/0866
2021/0257007 A1   8/2021 Kota et al.

\* cited by examiner

CHIP DESIGN VERIFICATION SYSTEM, CHIP DESIGN VERIFICATION METHOD, AND COMPUTER READABLE RECORDING MEDIA WITH STORED PROGRAM

CROSS-REFERENCE TO RELATED APPLICATION

This non-provisional application claims priority under 35 U.S.C. § 119(a) to Patent Application No. 202111562327.4 filed in China, P.R.C. on Dec. 20, 2021, the entire contents of which are hereby incorporated by reference.

BACKGROUND

Technical Field

The instant disclosure relates to digital chip design verification technologies, especially a chip design verification system and a chip design verification method capable of verifying chip designs with one-time programmable (OTP) units.

Related Art

With the advances of chip manufacture technology and market-wise constant increase of requirement of chips, the complexity of chips grows higher and higher. As a result, the requirement of chip verification also grows higher and higher. In order to more realistically emulate chip operation, a verification platform which is more complete and capable of better emulating practical chip operation is desired. Nowadays, one-time programmable (OTP) modules are widely used in chips. The one-time programmable method is a fusing method. The fusing method only allows modification at the start, and the modification can only be done once. Once the modification is done, the modification cannot be reversed. A one-time programmable module can be used to store data produced by memory repair (i.e., stored repair data) or information of chips, such as compatible power voltage, version number, and manufacture date. After a die is manufactured, a manufacturer will perform tests and write chip information into the one-time programmable module. The accuracy of the operation of the one-time programmable module dictates whether the chip having the one-time programmable module can operate normally. Besides, in order to quickly test chips, a one-time programmable module usually includes multiple test functions. The accuracy of the operation of these test functions is important for chip selection and chip operation. In order to increase chip tape-out success rate, how to test the design of a one-time programmable module becomes an important issue.

SUMMARY

In view of the above, some exemplary embodiments of the instant disclosure provide a chip design verification system, a chip design verification method, and a computer readable recording medium with a stored program for the verification of a module under test, in order to alleviate the technical issues known to the inventor.

An exemplary embodiment of the instant disclosure provides a chip design verification system for the verification of a module under test. In this exemplary embodiment, the module under test comprises a one-time programmable module, a register module, and a register controller circuit. The one-time programmable module comprises a plurality of storage space modules, and each of the storage space modules has a unique number. The register module comprises a plurality of registers. The chip design verification system comprises an agent module and a result verification module. The agent module comprises a sequencer module and a driver module. The sequencer module is configured to enable a sequence module to generate a plurality of test data sets. Each of the test data sets comprises a location data and a specific written data. The result verification module is coupled to the agent module and the module under test. The chip design verification system is configured to perform the following steps: transmitting, by the driver module, the test data sets to the result verification module and performing, by the driver module, a write procedure to write the test data sets into the storage space modules; performing, by the module under test, an autoload function to load the test data sets stored in the storage space modules into the registers correspondingly; and reading, by the result verification module, a plurality of first readout values corresponding to the test data sets at the registers according to the location data of each of the test data sets and comparing, by the result verification module, the test data sets with the first readout values to determine whether the autoload function is normal.

An exemplary embodiment of the instant disclosure provides a chip design verification method. The chip design verification method comprises the following steps: transmitting, by the driver module, the test data sets to the result verification module and performing, by the driver module, a write procedure so as to write the test data sets into the storage space modules; performing, by the module under test, the autoload function to load the test data sets stored in the storage space modules into the registers correspondingly; and reading, by the result verification module, a plurality of first readout values corresponding to the test data sets at the registers according to the location data of each of the test data sets and comparing by the result verification module, the test data sets with the first readout values to determine whether the autoload function is normal.

An exemplary embodiment of the instant disclosure provides a computer readable medium with a stored program. After a processor loads and executes the stored program, the computer readable recording medium makes the processor load a module under test file and configure the aforementioned module under test and chip design verification system on a logical level. The chip design verification system is configured to perform the following steps: transmitting, by the driver module, the test data sets to the result verification module and performing, by the driver module, a write procedure so as to write the test data sets into the storage space modules; performing, by the module under test, an autoload function so as to load the test data sets stored in the storage space modules into the registers correspondingly; and reading, by the result verification module, a plurality of first readout values corresponding to the test data sets at the registers according to the location data of each of the test data sets and comparing, by the result verification module, the test data sets with the first readout values so as to determine whether the autoload function is normal.

Based on the above, some exemplary embodiments of the instant disclosure provide a chip design verification system, a chip design verification method, and a computer readable medium with a stored program. By configuring the chip design verification system and the module under test and making the chip design verification system write test data into and read relevant readout values at the module under test, the design of the one-time programmable module can be tested.

BRIEF DESCRIPTION OF THE DRAWINGS

The disclosure will become more fully understood from the detailed description given herein below for illustration only, and thus not limitative of the disclosure, wherein:

FIG. 3-1 illustrates a block diagram of a chip design verification system and a module under test according to an exemplary embodiment of the instant disclosure;

FIG. 3-2 illustrates a schematic diagram of a write procedure according to an exemplary embodiment of the instant disclosure;

FIG. 4-1 illustrates a block diagram of a chip design verification system and a module under test according to an exemplary embodiment of the instant disclosure;

FIG. 4-2 illustrates a schematic diagram of an indirect access mode according to an exemplary embodiment of the instant disclosure;

DETAILED DESCRIPTION

The following detailed description with the exemplary embodiments supported by the figures will provide a comprehensive illustration of the abovementioned technical context, specialties, and effects. The thicknesses or dimensions of the elements in the figures may be exaggerated or abbreviated for a person having ordinary skill in the art to read and understand, and the sizes of the elements in the figures may not be their actual sizes, and the instant disclosure is not limited thereto. The sizes of the elements in the figures do not possess any technically practical meaning, and any structural retouch, ratio adjustment, and size adjustment shall fall into the scope of the disclosed technical context as long as they do not change the effect and goal achieved in this instant disclosure. In all figures, identical or similar elements are denoted using the same symbol.

Figure 1:
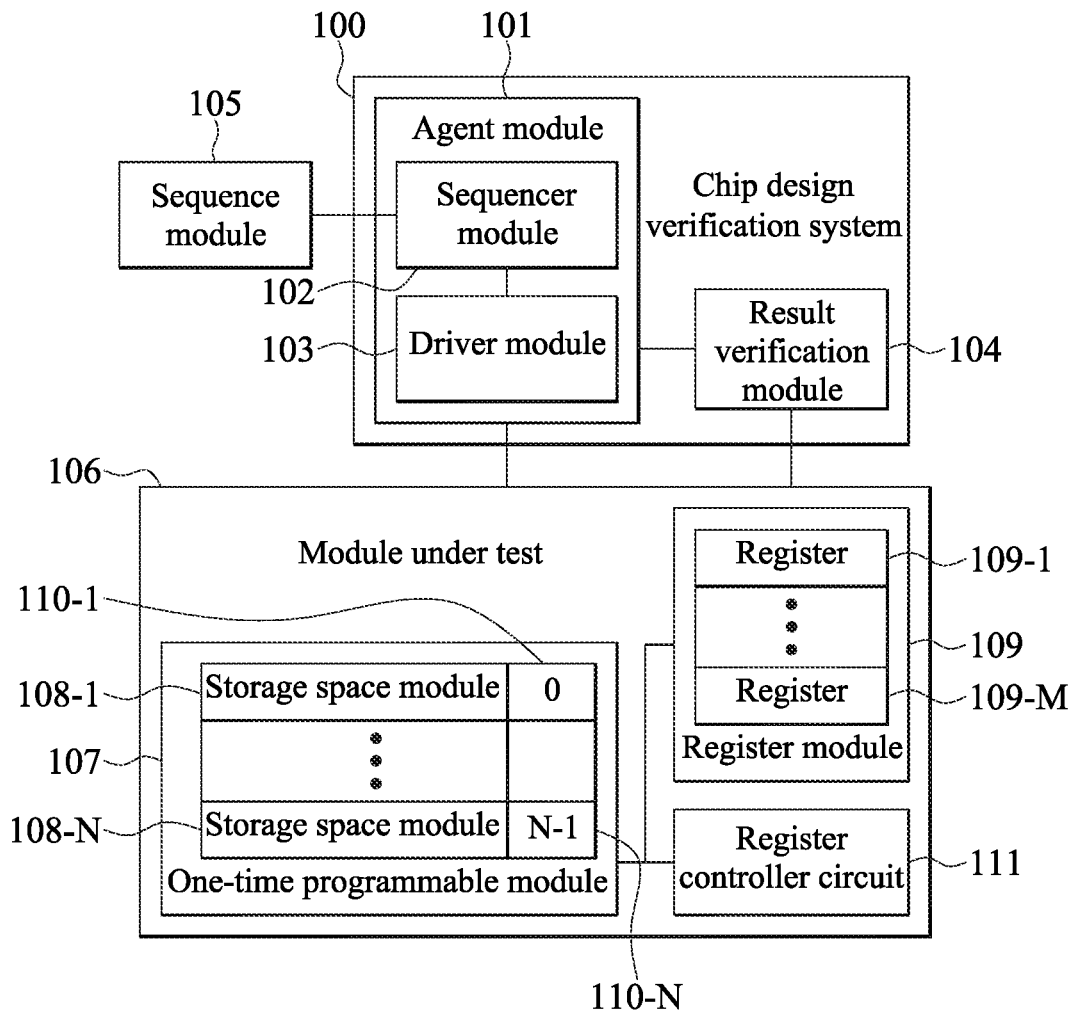
FIG. 1 illustrates a block diagram of a chip design verification system and a module under test according to an exemplary embodiment of the instant disclosure.

FIG. 1 illustrates a block diagram of a chip design verification system and a module under test according to an exemplary embodiment of the instant disclosure. Please refer to FIG. 1. The chip design verification system 100 is adapted to verify a module under test 106. The chip design verification system 100 comprises an agent module 101 and a result verification module 104. The agent module 101 comprises a sequencer module 102 and a driver module 103, wherein the sequencer module 102 is configured to enable a sequence module 105 to generate a plurality of test data sets. In this exemplary embodiment, each of the test data sets comprises a location data and a specific written data. The result verification module 104 is coupled to the agent module 101 and the module under test 106. The module under test 106 comprises a one-time programmable module 107, a register module 109, and a register controller circuit 111. The one-time programmable module 107 comprises a plurality of storage space modules 108-1~108-N. Each of the storage space modules 108-1~108-N has a corresponding number 110-1~110-N. The register module 109 comprises a plurality of registers 109-1~109-M, wherein N and M are positive integers, and the values of N and M are determined according to the design of the module under test 106. This instant disclosure does not limit the values of N and M.

In the following paragraphs, the chip design verification method and the operation between various modules of the chip design verification system 100 and the module under test 106 in some exemplary embodiments will be illustrated with the accompanying figures.

Figure 2:
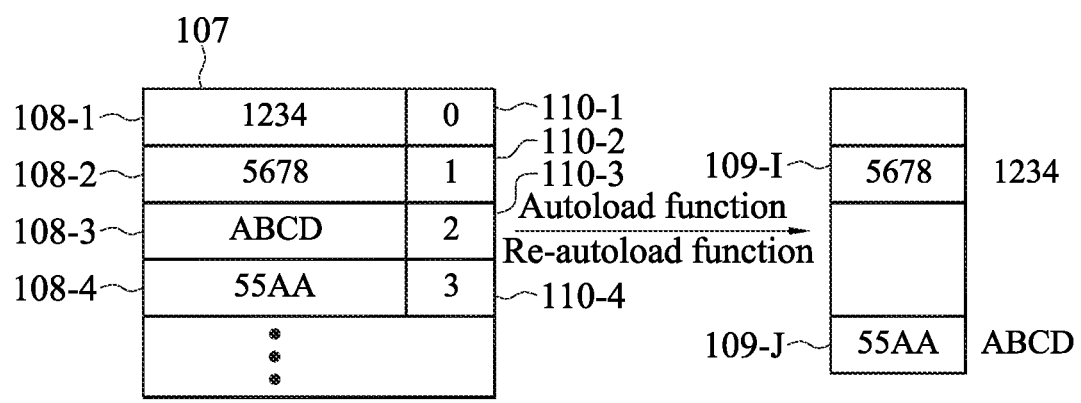
FIG. 2 illustrates an operation diagram of the chip design verification system according to some exemplary embodiments of the instant disclosure.
Figure 7:
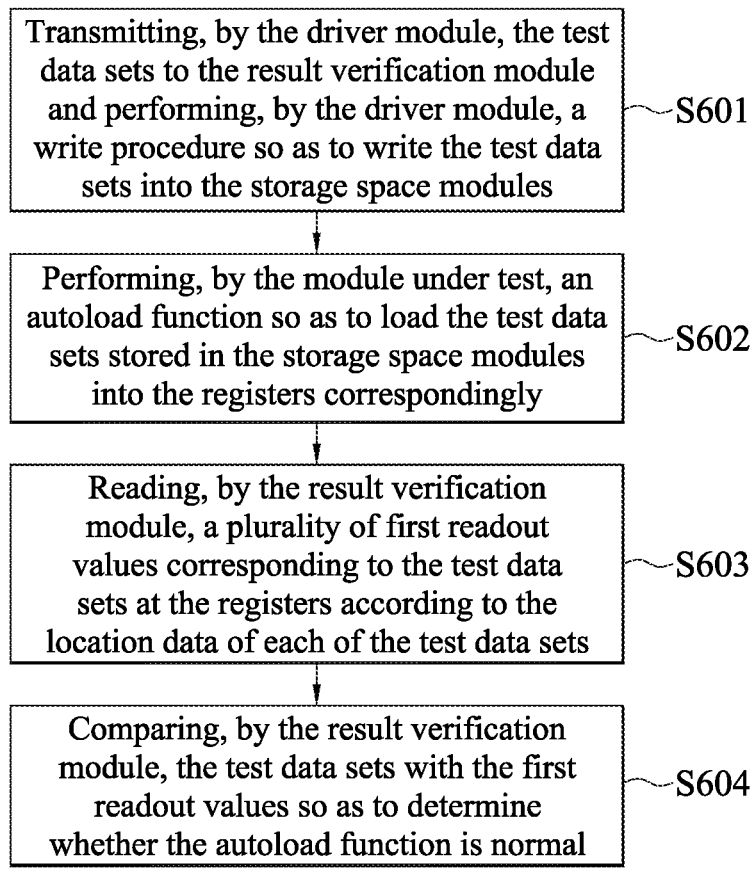
FIG. 7 illustrates a flow chart of a chip design verification method according to some exemplary embodiments of the instant disclosure.

FIG. 2 illustrates an operation diagram of the chip design verification system 100 according to some exemplary embodiments of the instant disclosure. FIG. 7 illustrates a flow chart of a chip design verification method according to some exemplary embodiments of the instant disclosure. Please refer to FIG. 1, FIG. 2, and FIG. 7. In the step S601, the driver module 103 transmits a plurality of test data sets to the result verification module 104. Simultaneously, the driver module 103 performs a write procedure to write the test data sets into the storage space modules of the one-time programmable module 107. In the exemplary embodiment shown in FIG. 2, the test data sets comprise a first test data set 1234 and 5678 and a second test data set ABCD and 55AA. In this embodiment, 1234 is a location data of the first test data set, 5678 is a specific written data of the first data set, ABCD is the location data of the second test data set, and 55AA is the specific written data of the second test data set. Simultaneously, the driver module 103 also performs the write procedure to write the first test data set and the second test data set into the storage space modules 108-1, 108-2, 108-3, and 108-4 of the one-time programmable module 107, and numbers of the storage space modules 108-1, 108-2, 108-3, and 108-4 are 0(110-1), 1(110-2), 2(110-3), and 3(110-4), respectively.

In the step S602, the module under test 106 performs an autoload function to load the test data sets stored in the storage space modules 108-1, 108-2, 108-3, and 108-4 (i.e., the aforementioned first test data set and second test data set in the exemplary embodiment shown in FIG. 2) into the registers in the register module 109 correspondingly. In the exemplary embodiment shown in FIG. 2, the location into which the specific written data 5678 of the first data set is written is the register 109-I, which corresponds to the location data 1234 of the first test data set, and the location into which the specific written data 55AA of the second data set is written is the register 109-J, which corresponds to the location data ABCD of the second test data set; I and J are integers between 1 and M.

In the step S603, the result verification module 104 reads a plurality of first readout values corresponding to the test data sets at the registers 109-1~109-M in the register module 109 according to the location data of each test data set (i.e., each of the aforementioned first test data set and second test data set in the exemplary embodiment shown in FIG. 2). In the exemplary embodiment shown in FIG. 2, the result verification module 104 reads a value stored in the register 109-I corresponding to the location data 1234 and a value stored in the register 109-J corresponding to the location data ABCD as the aforementioned first readout values according to the location data 1234 of the first test data set and the location data ABCD of the second test data set. In the step S604, the result verification 104 compares the test data sets (i.e., the aforementioned first test data set and second test data set in the exemplary embodiment shown in FIG. 2) with the first readout values to determine whether the autoload function is normal. In this embodiment, the result verification module 104 compares the value read at the register 109-I corresponding to the location data 1234 with the specific written data 5678 of the first test data set, and the result verification module 104 also compares the value read at the register 109-J corresponding to the location data ABCD with the specific written data 55AA of the second test data set. If both comparison results turn out identical, the result verification module 104 determines that the autoload function is normal. If any one of the comparison results turns out not identical, the result verification module 104 determines that the autoload function is not normal.

The aforementioned write procedure comprises two different ways. In the first way, the driver module 103 directly writes the test data sets (i.e., the aforementioned first test data set and second test data set in the exemplary embodiment shown in FIG. 2) into the storage space modules (i.e., the storage space modules 108-1~108-4 in this exemplary embodiment) of the one-time programmable module 107. The first way is to emulate the situation that data already have been written in the one-time programmable module when a chip is manufactured. When an actual chip is powered and operational, interior elements of the chip will automatically trigger the aforementioned autoload function, and then the one-time programmable module in the actual chip will download stored data into registers inside the actual chip.

It should be explained that, in the exemplary embodiment shown in FIG. 2, the driver module 103 directly writes the test data sets (i.e., the aforementioned first test data set and second test data set in the exemplary embodiment shown in FIG. 2) into the storage space modules of the one-time programmable module 107 in the order of the location data and then the specific written data. However, this order of writing is designed based on the autoload function of the module under test 106. The driver module 103 can directly write data into the storage space modules of the one-time programmable module 107 in different orders based on different designs.

Figures 1, 3:
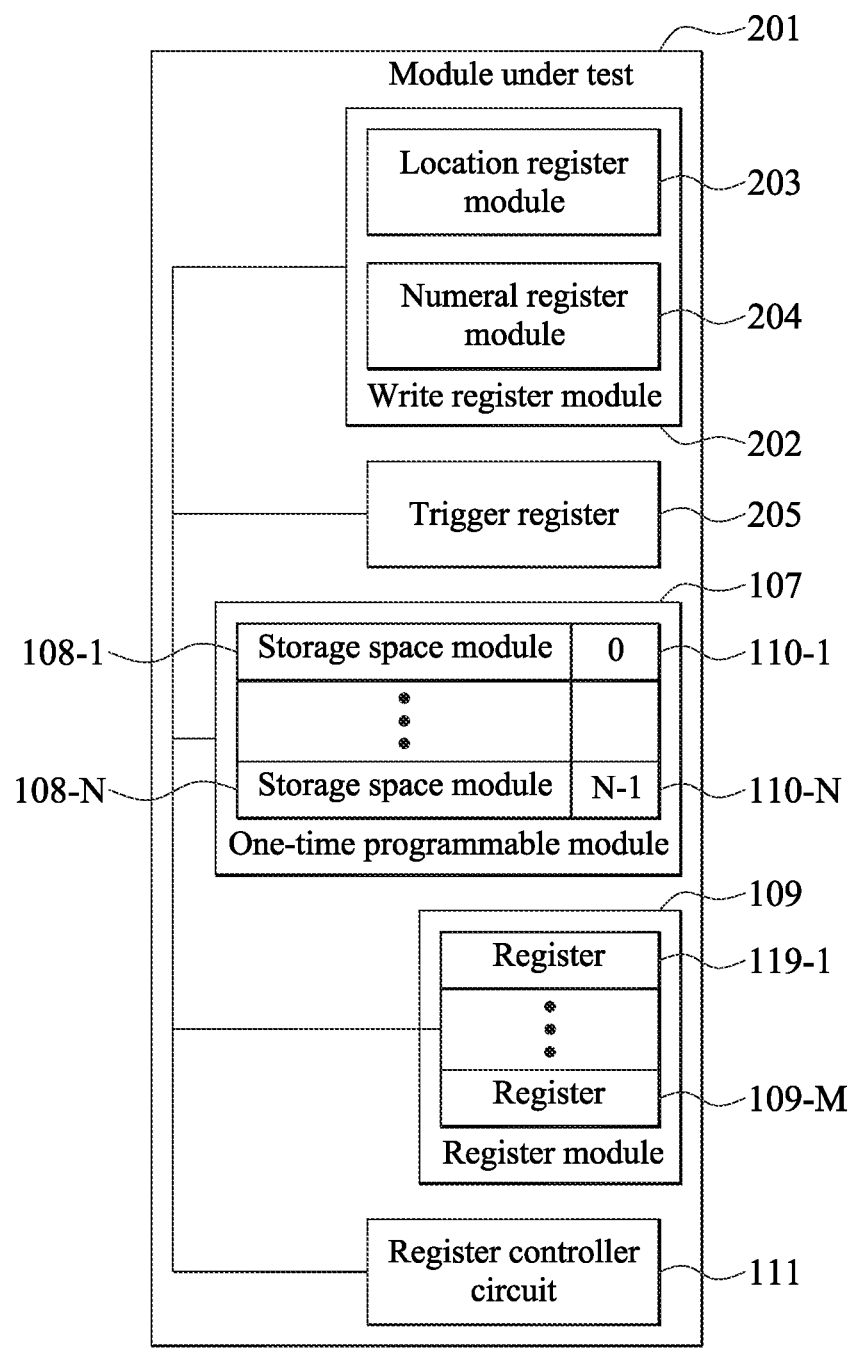
Figures 2, 3:
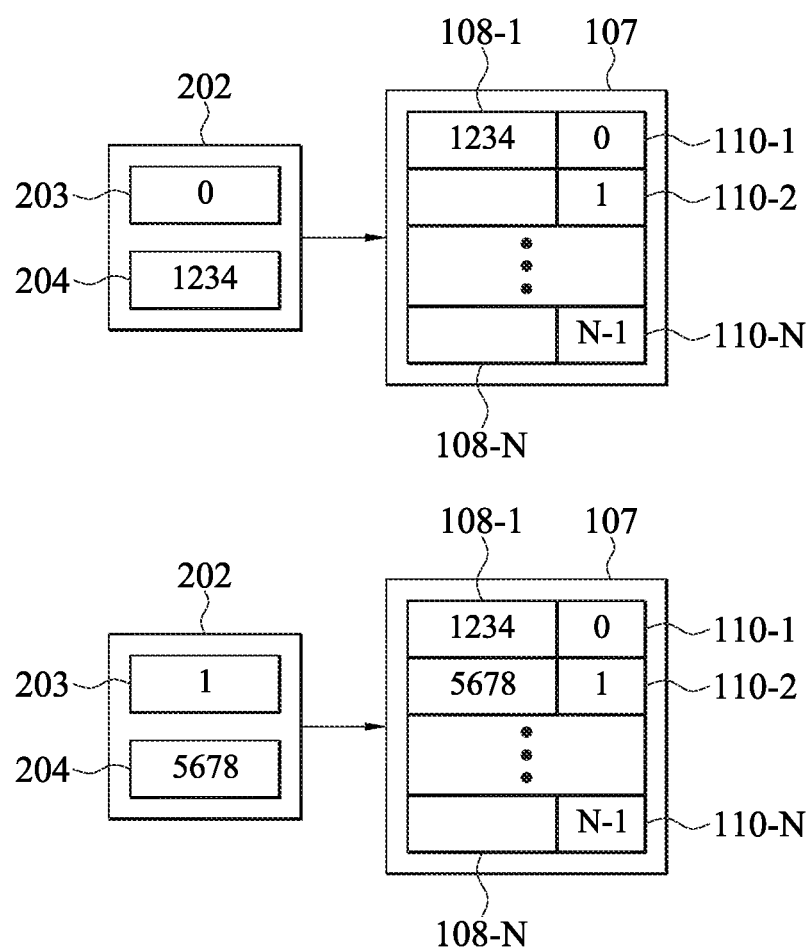
Figure 8:
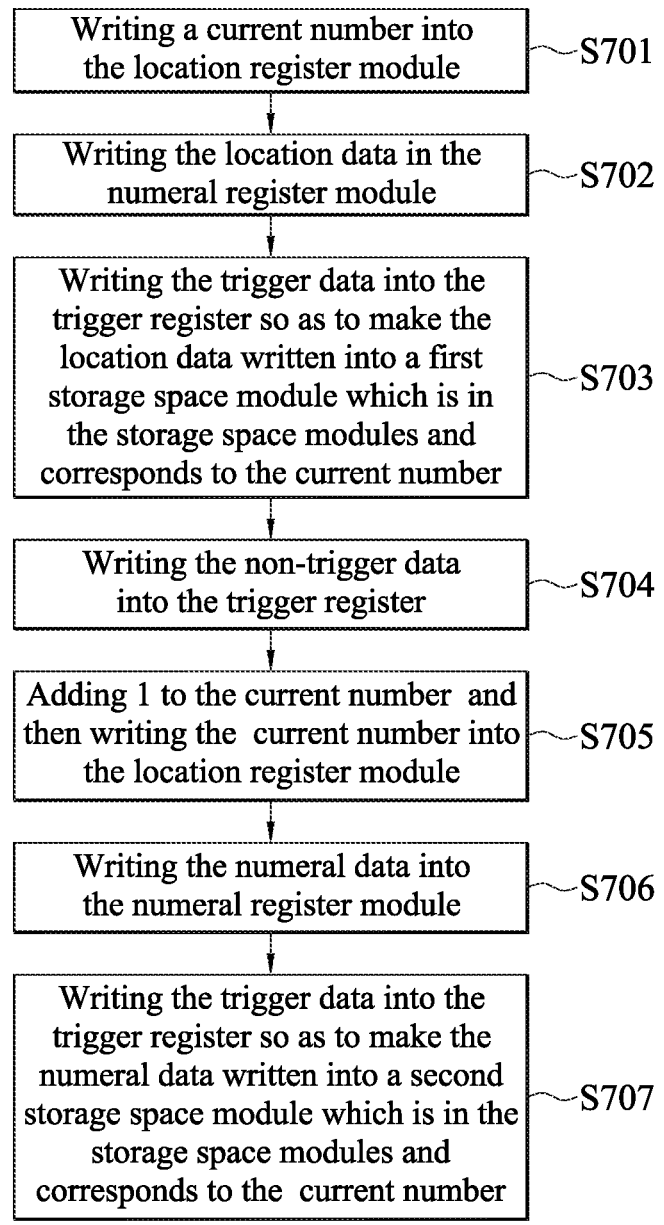
FIG. 8 illustrates a flow chart of a write procedure according to an exemplary embodiment of the instant disclosure.

The other way of the aforementioned write procedure is indirect access. FIG. 3-1 illustrates a block diagram of the chip design verification system and a module under test according to an exemplary embodiment of the instant disclosure. FIG. 3-2 illustrates a schematic diagram of a write procedure according to an exemplary embodiment of the instant disclosure. FIG. 8 illustrates a flow chart of a write procedure according to an exemplary embodiment of the instant disclosure. Please refer to FIG. 3-1, FIG. 3-2, and FIG. 8. Compared with the module under test 106 shown in FIG. 1, the module under test 201 shown in FIG. 3-1 further comprises a write register module 202 and a trigger register 205. In this embodiment, the write register module 202 comprises a location register module 203 and a numeral register module 204.

In the step S701, the driver module 103 writes a current number into the location register 203. In the exemplary embodiment shown in FIG. 3-2, the current number is 0. In the step S702, the driver module 103 writes the location data 1234 into the numeral register module 204. In the step S703, the driver module 103 writes a trigger data into the trigger register 205 to write the location data 1234 into a first storage space module which is in the storage space modules 108-1~108-N and corresponds to the current number. In the exemplary embodiment shown in FIG. 3-2, the first storage space module is the storage space module 108-1. In this embodiment, the trigger data is 1. It should be explained that, the value of the trigger data is designed based on the write function of the module under test 106. The driver module 103 may write trigger data with different values into the trigger register 205 in response to different designs of the module under test 201.

In the step S704, before the driver module 103 writes the data into the location register module 203 and the numeral register module 204, the driver module 103 writes a non-trigger data into the trigger register 205. In this exemplary embodiment, the non-trigger data is 0. In the step S705, the driver module 103 adds 1 to the current number as a renewed current number and then writes the renewed current number into the location register module 203. In the exemplary embodiment shown in FIG. 3-2, the current number 0 is added by 1 and then written into the location register module 203. In the step S706, the driver module 103 writes the specific written data 5678 into the numeral register module 204. In the step S707, the driver module 103 once again writes the trigger data 1 into the trigger register 205 to write the specific written data 5678 into a second storage space module which is in the storage space modules 108-1~108-N and corresponds to the current number. In the exemplary embodiment shown in FIG. 3-2, the second storage space module is the storage space module 108-2.

Figure 9:
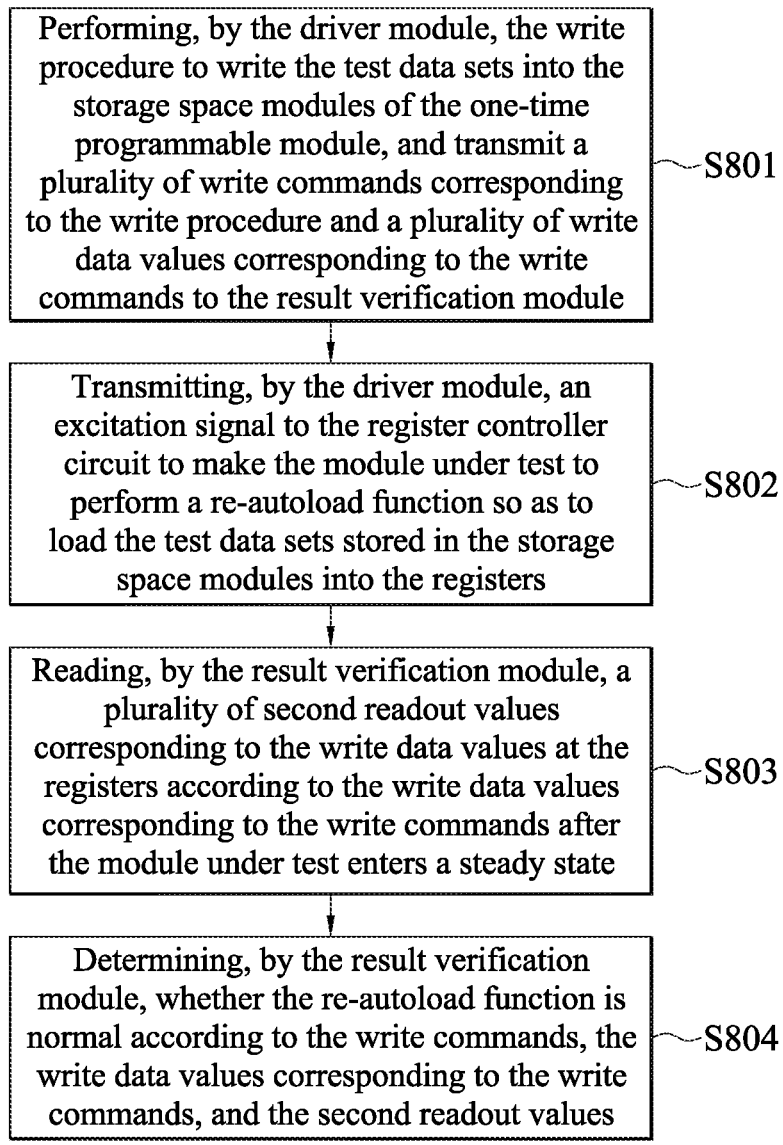
FIG. 9 illustrates a flow chart of a chip design verification method according to some exemplary embodiments of the instant disclosure.

In some exemplary embodiments of the instant disclosure, a method is provided to verify a re-autoload function of the module under test 106. The aforementioned re-autoload function refers to the following actions: after the aforementioned autoload function, if the write procedure is to be performed on the one-time programmable module 107, new write data should be downloaded into the register module 109, and therefore the re-autoload function has to be performed to download the new write data into the register module 109. FIG. 9 illustrates a flow chart of a chip design verification method according to some exemplary embodiments of the instant disclosure. Please refer to FIG. 1, FIG. 2, and FIG. 9.

In the step S801, the deriver module 103 performs the write procedure to write the test data sets into the storage space modules of the one-time programmable module 107 and transmits a plurality of write commands corresponding to the write procedure and a plurality of write data values corresponding to the write commands to the result verification module 104. In the exemplary embodiment shown in FIG. 2, the test data sets comprise a first test data set 1234 and 5678 and a second test data set ABCD and 55AA. In this exemplary embodiment, 1234 is the location data of the location data of the first test data set, 5678 is the specific written data of the first test data set, ABCD is the location data of the second test data set, and 55AA is the specific written data of the second test data set. Simultaneously, the driver module 103 also performs the write procedure to write the first test data set and the second test data set into the storage space modules 108-1, 108-2, 108-3, and 108-4 of the one-time programmable module 107, and numbers of the storage space modules 108-1, 108-2, 108-3, and 108-4 are 0(110-1), 1(110-2), 2(110-3), and 3(110-4), respectively. According to this exemplary embodiment, in the write procedure, the aforementioned driver module 103 directly writes the test data sets (i.e., the aforementioned first test data set and second test data set in the exemplary embodiment shown in FIG. 2) into the storage space modules of the one-time programmable module 107. Because the driver module 103 directly writes the test data sets into the storage space modules 108-1~108-N of the one-time programmable module 107, the write commands corresponding to the write procedure and the write data values corresponding to the write commands are (write, 0, 1234), (write, 1, 5678), (write, 2, ABCD), and (write, 3, 55AA).

In the step S802, the driver module 103 transmits an excitation signal to the register controller circuit 111 to allow the module under test 106 to perform the re-autoload function to load the test data sets (i.e., the aforementioned first test data set and second test data set in the exemplary embodiment shown in FIG. 2) stored in the storage space modules 108-1, 108-2, 108-3, and 108-4 into the register modules 109 correspondingly. In the exemplary embodiment shown in FIG. 2, the specific written data 5678 of the first test data set is written into the register 109-I corresponding to the location data 1234 of the first test data set, and the specific written data 55AA of the second test data set is written into the register 109-J corresponding to the location data ABCD of the second test data set,; I and J are integers between 0 and M.

In the step S803, after the module under test 106 enters a steady state, the result verification module 104 reads a plurality of second readout values corresponding to the write data values at the registers 109-1~109-M according to the write data values corresponding to the write commands. In the exemplary embodiment shown in FIG. 2, because the write data are (write, 0, 1234), (write, 1, 5678), (write, 2, ABCD), and (write, 3, 55AA), the result verification module 104 determines that locations of the registers at which to read are 1234 and ABCD. The result verification module 104 will then read a plurality of second readout values at the locations 1234 and ABCD.

In the step S804, the result verification module 104 determines whether the re-autoload function is normal according to the write commands, the write data values corresponding to the write commands, and the second readout values corresponding to the write data values. In this exemplary embodiment, the result verification module 104 compares a value read at the register 109-I corresponding to the location data 1234 with the specific written data 5678 of the first test data set, and the result verification module 104 also compares a value read at the register 109-J corresponding to the location data ABCD with the specific written data 55AA of the second test data set. If the both comparison results turn out identical, the result verification module 104 determines that the re-autoload function is normal. If any one of the comparison results turns out not identical, the result verification module 104 determines that the re-autoload function is not normal.

It should be noted that, according to the aforementioned exemplary embodiment, in the write procedure, the driver module 103 directly writes the test data sets into the storage space modules of the one-time programmable module 107. In some other embodiments, the write procedure may also be the indirect access shown in FIG. 8, and the instant disclosure is not limited thereto.

Figures 1, 4:
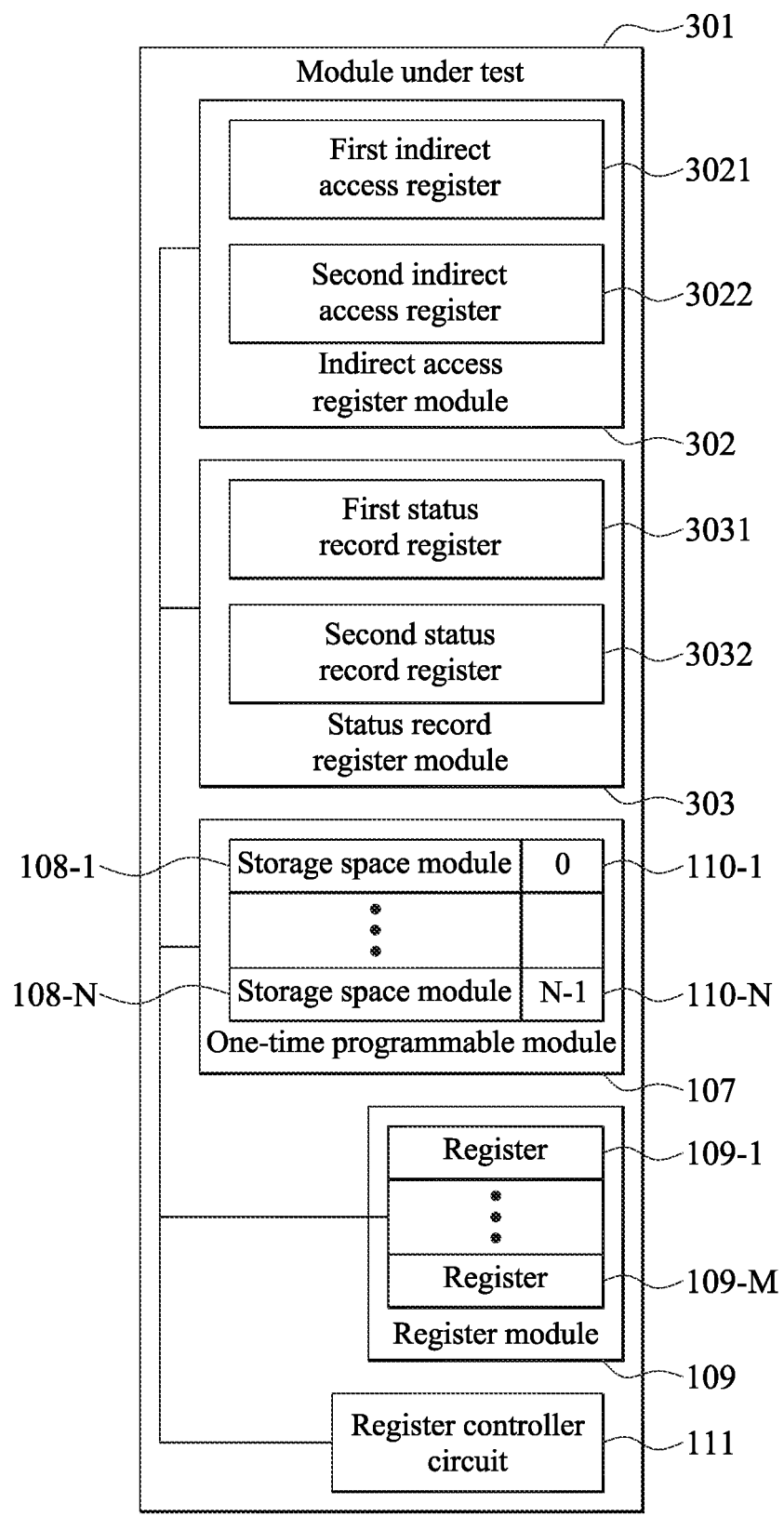
Figures 2, 4:
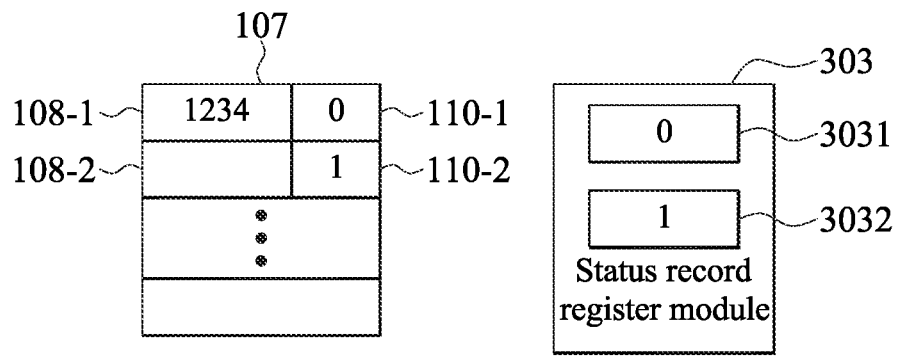
Figure 10:
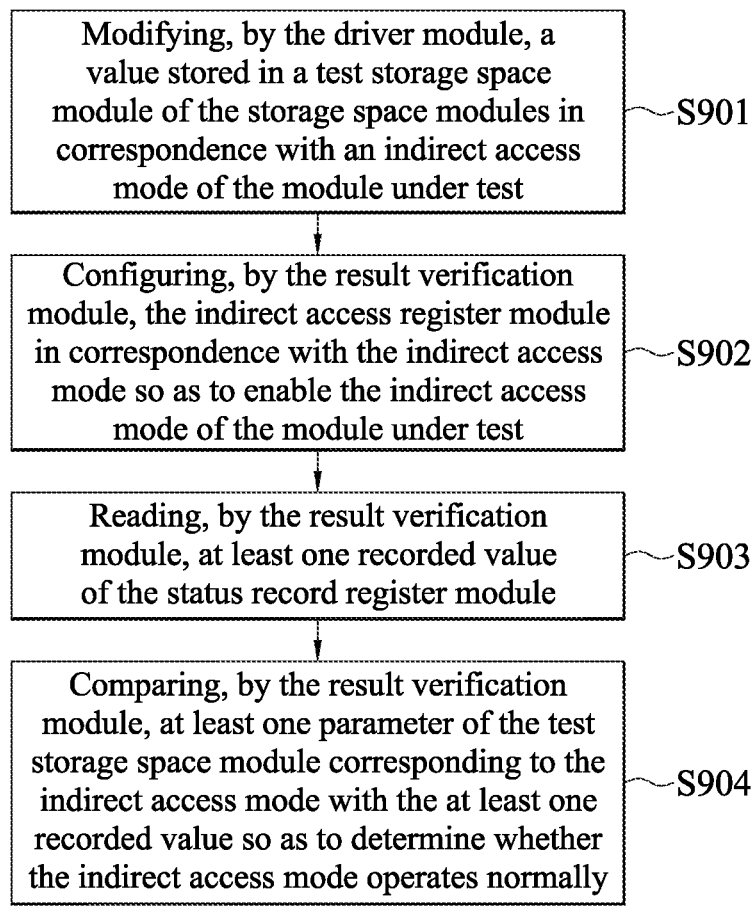
FIG. 10 illustrates a flow chart of an indirect access mode verification method according to some exemplary embodiments of the instant disclosure.
Figure 11:
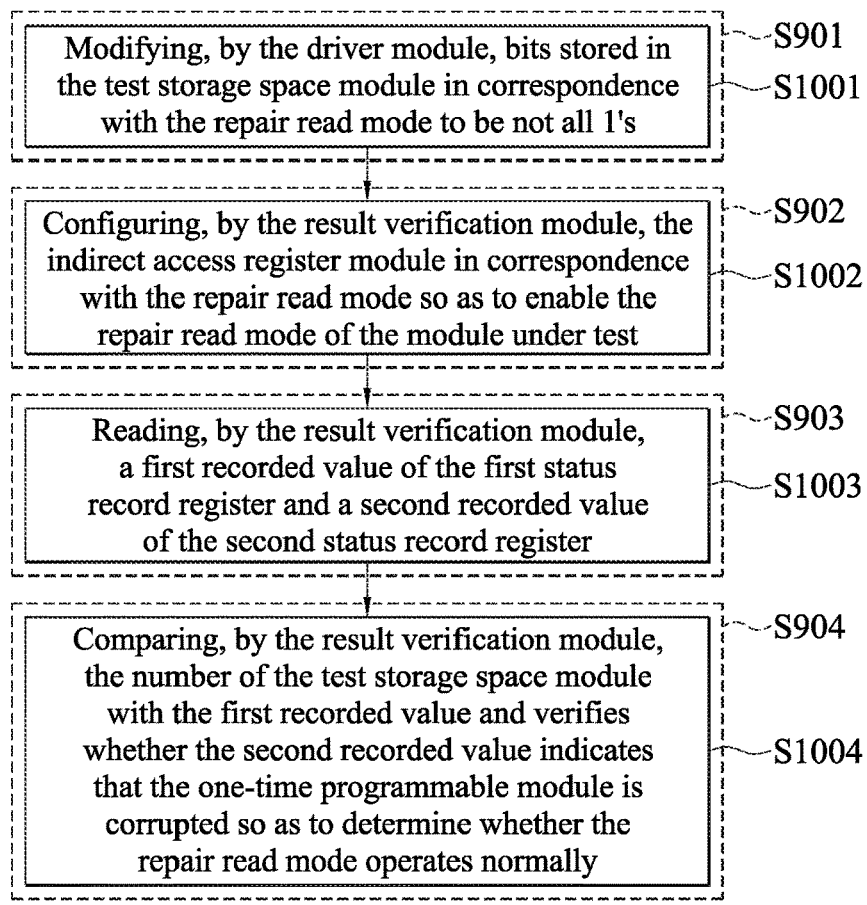
FIG. 11 illustrates a flow chart of a repair read mode verification method according to some exemplary embodiments of the instant disclosure.

The one-time programmable module 107 may, in general, further have some specific functions, and these specific functions should cooperate with some specific registers. In some exemplary embodiments of the instant disclosure, a method is provided to check these specific functions. FIG. 4-1 illustrates a block diagram of a chip design verification system and a module under test according to an exemplary embodiment of the instant disclosure. FIG. 4-2 illustrates a schematic diagram of an indirect access mode according to an exemplary embodiment of the instant disclosure. FIG. 10 illustrates a flow chart of an indirect access mode verification method according to some exemplary embodiments of the instant disclosure. FIG. 11 illustrates a flow chart of a repair read mode verification method according to some exemplary embodiments of the instant disclosure. Please refer to FIG. 4-1, FIG. 4-2, FIG. 10, and FIG. 11. Compared with the module under test 106 shown in FIG. 1, the module under test 103 shown in FIG. 4-1 further comprises an indirect access register module 302 and a status record register module 303. The indirect access register module 302 corresponds to an indirect access mode of the module under test 301. The indirect access register 302 and the status record register module 303 each comprise a plurality of registers. The serial number of registers in the indirect access register 302 and the serial number of registers in the status record register module 303 are determined by the design of the indirect access mode of the module under test 301. For example, when the indirect access mode is the repair read mode, the indirect access register module 302 comprises a first indirect access register 3021 and a second indirect access register 3022, and the status record register module 303 comprises a first status record register 3031 and a second status record register 3032.

In the following paragraphs, the indirect access mode is the repair read mode as an example. In the step S901 (corresponding to the step S1001), the driver module 103 modifies a value stored in a test storage space module in the storage space modules 108-1~108-N in correspondence with the indirect access mode of the module under test 301. In this exemplary embodiment, the indirect access mode is the repair read mode, and the test storage space module is the storage space module 108-1 having a number 0. The driver module 103 modifies bits stored in the storage space module 108-1 to be not all 1's.

For example, the bits can be modified as 1234.

In the step S902 (corresponding to the step S1002), in correspondence with the indirect access mode being the repair read mode, the result verification module 104 configures a value of the first indirect access register 3021 of the indirect access register module 302 to be 0x8371 and configures a value of the second indirect access register 3022 of the indirect access register module 302 to be 0x0000 to enable the indirect access mode of the module under test 301, wherein 0x8371 indicates activation of an accessible mode of the one-time programmable module 107, and 0x0000 indicates the activation of repair read mode and indicates the locations of the first indirect access register 3021 and the second indirect access register 3022. It should be explained that, the aforementioned values (i.e. 0x8371 and 0x0000) are only illustrative examples, and actual values of the indirect access registers are determined based on the design of the module under test 106, and the instant disclosure is not limited thereto.

In the step S903 (corresponding to the step S1003), the result verification module 104 reads at least one recorded value of the status record register module 303. In this exemplary embodiment, the result verification module 104 reads a first recorded value stored in the first status record register 3031 of the status record register module 303 and a second recorded value stored in the second status record register 3032 of the status record register module 303 as the aforementioned at least one recorded value.

In the repair read mode, the module under test 301 is designed to search whether numbers of the storage space modules in which the stored values are not all 1's exist in the one-time programmable module 107. If so, the one-time programmable module 107 is corrupted, and the module under test 301 will write the numbers of the storage space modules in which the stored values are not all 1's into the first status record register 3031 and write 1 into the second status record register 3032 to indicate that the one-time programmable module 107 is corrupted. As a result, in the step S904 (corresponding to the step S1004), the result verification module 104 compares at least one parameter of the test storage space mode (i.e., the storage space module 108-1 in this example) corresponding to the indirect access mode with the aforementioned at least one recorded value (i.e., the values stored in the first status record register 3031 and the second status record register 3032) to determine whether the indirect access mode operate normally. In this exemplary embodiment, the at least one parameter of the test register module (i.e., the storage space module 108-1 in this example) corresponding to the indirect access mode is the serial number of the test storage space module (i.e., 0 in this example). The result verification module 104 compares the first recorded value with the serial number of the test storage space module (i.e., 0 in this example). If the first recorded value and the serial number of the test storage space module (i.e., 0 in this example) are identical, the result verification module 104 further verifies whether the second recorded value is 1, which indicates that the one-time programmable module 107 is corrupted. If the both comparison results turn out identical, it indicates that the repair read mode is operating normally. If at least one of the comparison results turns out not identical, it indicates that the repair read mode is not operating normally.

Figure 5:
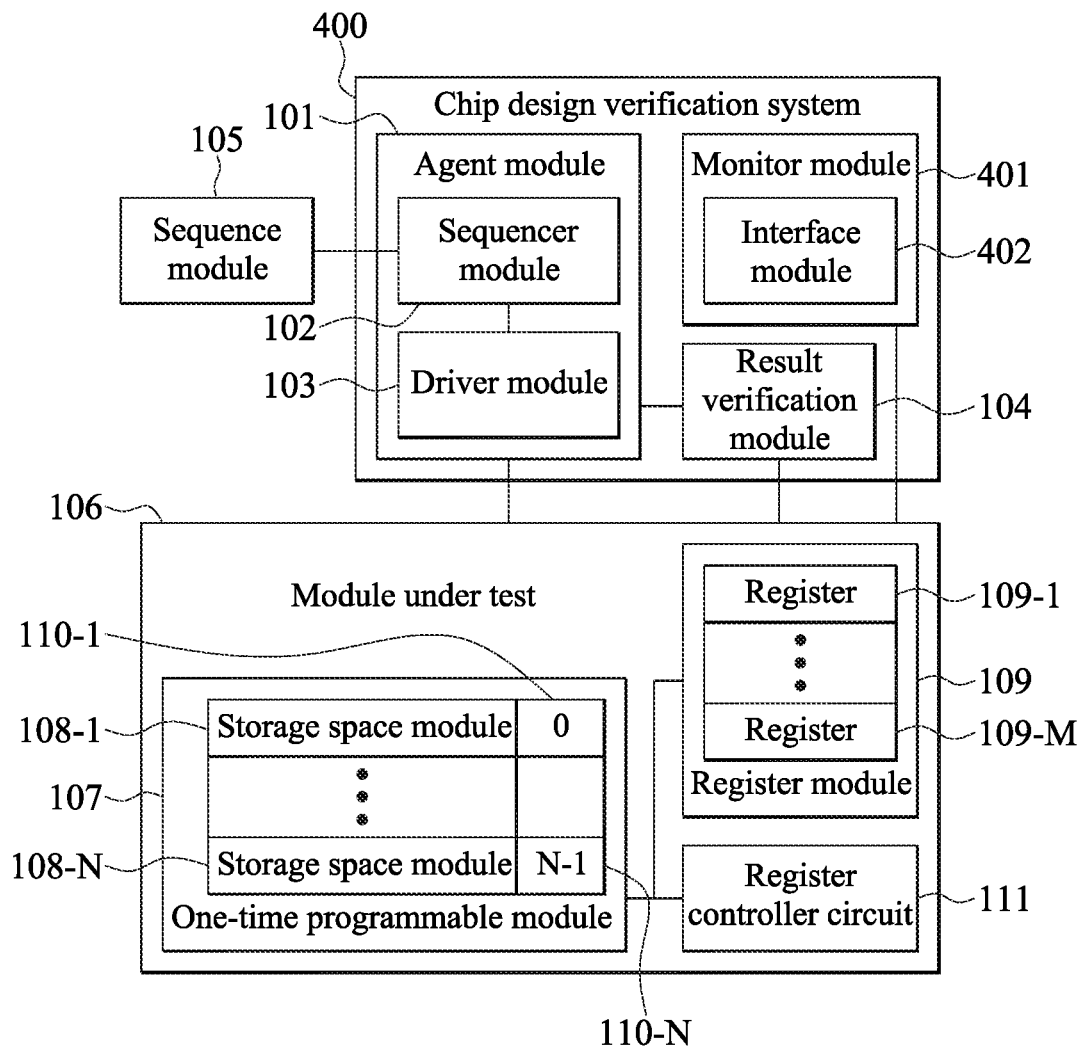
FIG. 5 illustrates a block diagram of a chip design verification system and a module under test according to an exemplary embodiment of the instant disclosure.
Figure 12:
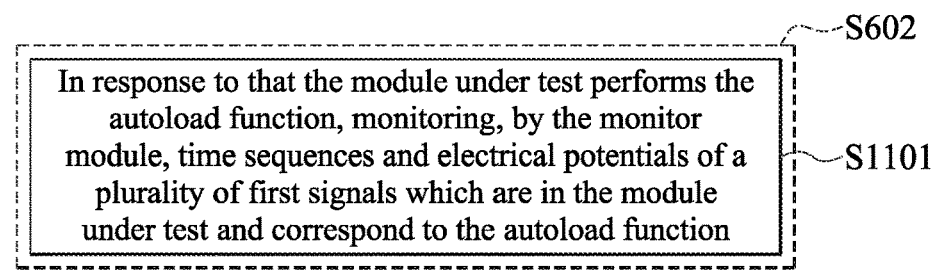
FIG. 12 illustrates a flow chart of a chip design verification method according to an exemplary embodiment of the instant disclosure.

FIG. 5 illustrates a block diagram of a chip design verification system and a module under test according to an exemplary embodiment of the instant disclosure. FIG. 12 illustrates a flow chart of a chip design verification method according to an exemplary embodiment of the instant disclosure. Please refer to FIG. 5 and FIG. 12. Compared with the chip design verification system 100 shown in FIG. 1, the chip design verification system 400 shown in FIG. 5 further comprises a monitor module 401. The monitor module 401 comprises an interface module 402, and the monitor module 401 is connected to the module under test 104 via the interface module 402 through a direct connection. It should be explained that, the monitor module 401 may also be connected to the module under test 301 shown in FIG. 4-1 via the interface module 402 through a direct connection. In the step S602, the module under test 106 performs the autoload function. In response to that the module under test 106 performs the autoload function, the step S602 may further comprise the step S1101.

In the step S1101, the monitor module 401 monitors time sequences and electrical potentials of a plurality of first signals, which are in the module under test 106 and correspond to the autoload function, to verify that the time sequences and the electrical potentials of the first signals conform to the datasheet of the module under test 106. If the time sequences and the electrical potentials do not conform to the datasheet, the monitor module 401 will send out an error message.

Figure 13:
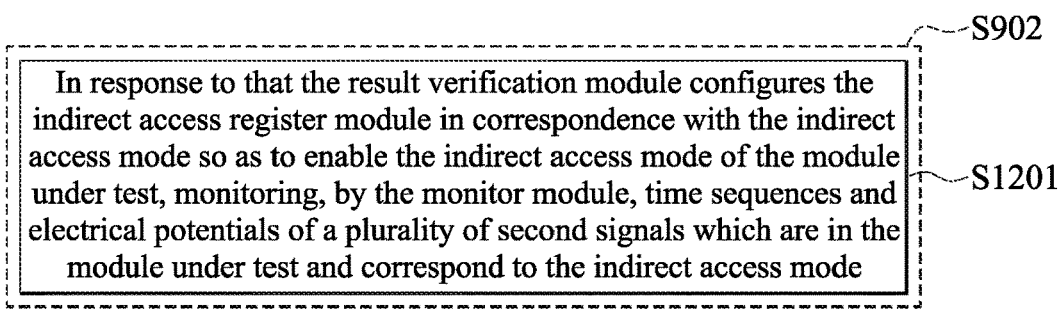
FIG. 13 illustrates a flow chart of a chip design verification method according to an exemplary embodiment of the instant disclosure.

FIG. 13 illustrates a flow chart of a chip design verification method according to an exemplary embodiment of the instant disclosure. Please refer to FIG. 4-1, FIG. 5, and FIG. 13. The monitor module 401 may also be connected to a module under test 301 shown in FIG. 4-1 via the interface module 402 through a direct connection. In the step S902, in correspondence with the indirect access mode, the result verification module 104 configures the indirect access register module 302 to enable the indirect access mode of the module under test 301. In response to that the result verification module 104 configures the indirect access register module 302 in correspondence with the indirect access mode to enable the indirect access mode of the module under test 301, the step S902 may further comprise the step S1201. In the step S1201, the monitor module 401 monitors time sequences and electrical potentials of a plurality of second signals, which are in the module under test 301 and correspond to the indirect access mode.

In some exemplary embodiments of the instant disclosure, the chip design verification system 100 is a verification platform which is constructed based on the Universal Verification Methodology (UVM). The UVM is a verification platform development framework with SystemVerilog's class library as its main body. A verification engineer can utilize the reusable components of the UVM to construct functional verification environments with standardized layered structures and ports. The aforementioned modules under test 106, 201, and 301 are implemented using circuit behaviors and hardware descriptions of a chip, which are both described by hardware description program files, so that the chip can be emulated. The hardware description program files may be, but not limited to, coded using codes such as very high-speed hardware description language (VHDL) and Verilog.

In one exemplary embodiment, the aforementioned driver module 103 is an instance of a class derived from the uvm_driver class of the UVM; the sequencer module 102 is an instance of a class derived from the uvm_sequencer class of the UVM; the sequence module 105 is an instance of a class derived from the uvm_sequence class of the UVM; the result verification module 104 is an instance of a class derived from the uvm_scoreboard class of the UVM; the monitor module 401 is an instance of a class derived from the uvm_monitor class of the UVM; the agent module 101 is an instance of a class derived from the uvm_agent class of the UVM, and the agent module 101 encapsulates the driver module 103 and the sequencer module 102; an env class derived from the uvm_env class of the UVM comprises the agent module 101, the result verification module 104, and the monitor module 401.

In this exemplary embodiment, in the monitor module 401, the interface module 402 is defined as otp_mntr_if, and a signal such as otp_ptm is defined to indicate the operation mode of the one-time programmable module 107. Different otp_ptm values correspond to different indirect access modes. Let otp_pce indicate the activation signal of the operation of the one-time programmable module 107, the following codes can be used to connect the signals of otp_mntr_if and interior signals of the module under test 106 (or the module under test 201/the module under test 301) with each other:

Assign otp_mntr_if.otp_ptm=dut.otp_ptm;
Assign otp_mntr_if.otp_pce=dut.otp_pce;
next, in the monitor module 401, the interior signals of the module under test 106 (or the module under test 201/the module under test 301) is monitored in real time and compared with the values regulated in the datasheet, and the variation time of the signal of otp_ptm is recorded and compared with the time according to the datasheet. For example, when the one-time programmable module 107 is in the read mode, the following condition should be satisfied: when otp_ptm changes, the rising edge of otp_pce and the time of otp_ptm change should not be less than $T_{ms}$. This condition can be checked using the following codes:

```
@(otp_mntr_if.otp_ptm);
start_time = $time;
@(posedge otp_mntr_if.otp_pce);
endtime = $time;
delta_time = end_Time - start_time;
If(delta_time <Tms)begin
    $display("TIMING CHECK ERROR");
end
else begin
    $display("TIMING CHECK PASS");
end
```

In some exemplary embodiments, the monitor module 401 can also check whether the values of the interior signals in the indirect access mode are correct using the following method. For example, when the indirect access mode is the read mode, otp_ptm should be equal to 0; when the result verification module 104 access the one-time programmable module 107 through the read mode, the following codes can be used to achieve this determination:

```
if(otp_mntr_if.otp_ptm!=0)begin
    $display("otp signal wrong");
end
else begin
    $display("otp signal write");
end
```

A number of different indirect access modes exist in the one-time programmable modules 107 of different chips. All indirect access modes can be checked using the abovementioned method. Besides, Different indirect access mode commands can be transmitted randomly to check whether the switching between the various modes may cause problems for the chips.

Figure 6:
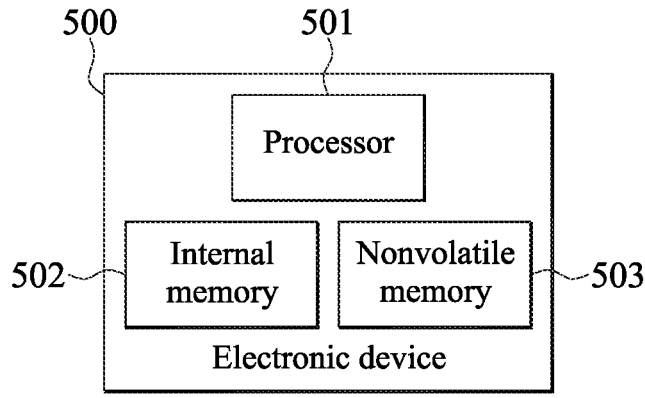
FIG. 6 illustrates a structural diagram of an electronic device according to some exemplary embodiments of the instant disclosure.

FIG. 6 illustrates a structural diagram of an electronic device 500 according to some exemplary embodiments of the instant disclosure. As shown in FIG. 6, on the hardware level, the electronic device 500 comprises a processor 501, an internal memory 502, and a nonvolatile memory 503. The internal memory 502 may be a random-access memory (RAM). Of course, it is understood that, the electronic device 500 may also comprise hardware for other functions.

The internal memory 502 and the nonvolatile memory 503 are configured to store a program, the program may comprise codes, and the codes may comprise computer operation instructions. The internal memory 502 and the nonvolatile memory 503 provide instructions and data for the processor 501. The processor 501 reads a corresponding computer program at the nonvolatile memory 503 and then runs the computer program at the internal memory 502. The processor 501 is configured to perform each step illustrated in FIG. 7 through FIG. 13.

The processor 501 may be an integrated circuit chip with signal processing capability. During implementation, the methods and the steps disclosed in the foregoing embodiments may be completed by an integrated logic circuit in a hardware form in the processor 501 or the instruction in a software form. The processor 1101 may be a general-purpose processor, including a central processing unit (CPU), a tensor processing unit, a digital signal processor (DSP), an application-specific integrated circuit (ASIC), a field-programmable gate array (FPGA), or other programmable logic apparatuses. The processor can implement or perform the methods and the steps disclosed in the foregoing embodiments.

In some exemplary embodiments of the instant disclosure, a computer readable record medium with a stored program is further provided. The computer readable record medium stores at least one instruction. When the at least one instruction is executed by the processor 501 of the electronic device 500, the processor 501 of the electronic device 500 loads module under test files and configures the module under test 106 (or the module under test 201/the module under test 301) and the chip design verification system 100 (or the chip design verification system 400) on a logical level. The chip design verification system is configured to perform the aforementioned steps illustrated in FIG. 7 through FIG. 13.

The recording medium of a computer may be, but is not limited to, a phase-change memory (PRAM), a static random access memory (SRAM), a dynamic random access memory (DRAM), other types of random access memories (RAMs), a read-only memory (ROM), an electrically erasable programmable read-only memory (EEPROM), a flash memory, other internal memory technologies, a CD-ROM, a DVD, other optical storages, a cassette tape, a tape drive, other magnetic storage device, or other non-transmission media, and the recording medium can be used to store data that can be accessed by a computing device. According to the definition in the instant disclosure, the computer readable medium excludes a transitory medium such as modulated data signal and carrier wave.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A chip design verification system adapted to verify a module under test, wherein the module under test comprises:
a one-time programmable module comprising a plurality of storage space modules, and each of the storage space modules has a number; a register module comprising a plurality of registers; and a register controller circuit;
the chip design verification system comprises:
an agent module comprising a sequencer module and a driver module, wherein the sequencer module is configured to enable a sequence module to generate a plurality of test data sets, and each of the test data sets comprises a location data and a specific written data; and
a result verification module coupled to the agent module and the module under test;
wherein the chip design verification system is configured to perform the following steps:

transmitting, by the driver module, the test data sets to the result verification module and performing, by the driver module, a write procedure so as to write the test data sets into the storage space modules;

performing, by the module under test, an autoload function so as to load the test data sets stored in the storage space modules into the registers correspondingly; and reading, by the result verification module, a plurality of first readout values corresponding to the test data sets at the registers according to the location data of each of the test data sets and comparing, by the result verification module, the test data sets with the first readout values so as to determine whether the autoload function is normal; wherein the chip design verification system is configured to further perform the following steps:

performing, by the driver module, the write procedure to write the test data sets into the storage space modules of the one-time programmable module, and transmit a plurality of write commands corresponding to the write procedure and a plurality of write data values corresponding to the write commands to the result verification module;

transmitting, by the driver module, an excitation signal to the register controller circuit to make the module under test to perform a re-autoload function so as to load the test data sets stored in the storage space modules into the registers;

reading, by the result verification module, a plurality of second readout values corresponding to the write data values at the registers according to the write data values corresponding to the write commands after the module under test enters a steady state; and determining, by the result verification module, whether the re-autoload function is normal according to the write commands, the write data values corresponding to the write commands, and the second readout values.

2. The chip design verification system according to claim 1, wherein the write procedure comprises: directly writing the test data sets into the storage space modules of the one-time programmable module.

3. The chip design verification system according to claim 1, wherein the module under test further comprises:
a write register module comprising a location register module and a numeral register module; and
a trigger register;
the write procedure comprises performing the following steps on each of the test data sets:
writing a current number into the location register module;
writing the location data into the numeral register module;
writing a trigger data into the trigger register so as to make the location data written into a first storage space module which is in the storage space modules and corresponds to the current number;
writing a non-trigger data into the trigger register;
adding 1 to the current number and then writing the current number into the location register module;
writing the specific written data into the numeral register module; and
writing the trigger data into the trigger register so as to make the specific written data written into a second storage space module which is in the storage space modules and corresponds to the current number.

4. The chip design verification system according to claim 1, wherein the module under test further comprises an indirect access register module and a status record register module;

the chip design verification system is configured to further perform the following steps:
modifying, by the driver module, a value stored in a test storage space module of the storage space modules in correspondence with an indirect access mode of the module under test;
configuring, by the result verification module, the indirect access register module in correspondence with the indirect access mode so as to enable the indirect access mode of the module under test;
reading, by the result verification module, at least one recorded value of the status record register module; and
comparing, by the result verification module, at least one parameter of the test storage space module corresponding to the indirect access mode with the at least one recorded value so as to determine whether the indirect access mode operates normally.

5. The chip design verification system according to claim 4, wherein the indirect access mode is a repair read mode, and the at least one parameter is the serial number of the test storage space module; the status record register module comprises a first status record register and a second status record register; the driver module modifies bits stored in the test storage space module in correspondence with the repair read mode to be not all 1's; the result verification module configures the indirect access register module in correspondence with the repair read mode so as to enable the repair read mode of the module under test; the result verification module reads a first recorded value of the first status record register and a second recorded value of the second status record register; the result verification module compares the serial number of the test storage space module with the first recorded value and verifies whether the second recorded value indicates that the one-time programmable module is corrupted so as to determine whether the repair read mode operates normally.

6. The chip design verification system according to claim 4, wherein the chip design verification system further comprises a monitor module, the monitor module comprises an interface module, and the interface module is connected to the module under test through a direct connection;
the chip design verification system is configured to further perform the following steps:
in response to that the result verification module configures the indirect access register module in correspondence with the indirect access mode so as to enable the indirect access mode of the module under test, monitoring, by the monitor module, time sequences and electrical potentials of a plurality of second signals which are in the module under test and correspond to the indirect access mode.

7. The chip design verification system according to claim 1, wherein the chip design verification system further comprises a monitor module, the monitor module comprises an interface module, and the interface module is connected to the module under test through a direct connection;
the chip design verification system is configured to further perform the following steps:
in response to that the module under test performs the autoload function, monitoring, by the monitor module, time sequences and electrical potentials of a plurality of first signals which are in the module under test and correspond to the autoload function.

8. A chip design verification method adapted to be applied in a chip design verification system to verify a module under test, wherein the module under test comprises: a one-time programmable module comprising a plurality of storage space modules, and each of the storage space modules has a number; a register module comprising a plurality of registers; and a register controller circuit; the chip design verification system comprises: an agent module comprising a sequencer module and a driver module, wherein the sequencer module is configured to enable a sequence module to generate a plurality of test data sets, and each of the test data sets comprises a location data and a specific written data; and a result verification module coupled to the agent module and the module under test;

the chip design verification method comprises:
transmitting, by the driver module, the test data sets to the result verification module and performing, by the driver module, a write procedure so as to write the test data sets into the storage space modules;
performing, by the module under test, an autoload function so as to load the test data sets stored in the storage space modules into the registers correspondingly; and
reading, by the result verification module, a plurality of first readout values corresponding to the test data sets at the registers according to the location data of each of the test data sets and comparing, by the result verification module, the test data sets with the first readout values so as to determine whether the autoload function is normal; wherein the chip design verification method further comprises the following steps:
performing, by the driver module, the write procedure to write the test data sets into the storage space modules of the one-time programmable module, and transmit a plurality of write commands corresponding to the write procedure and a plurality of write data values corresponding to the write commands to the result verification module;
transmitting, by the driver module, an excitation signal to the register controller circuit to make the module under test to perform a re-autoload function so as to load the test data sets in the storage space modules into the register;
reading, by the result verification module, a plurality of second readout values corresponding to the write data values at the registers according to the write data values corresponding to the write commands after the module under test enters a steady state; and
determining, by the result verification module, whether the re-autoload function is normal according to the write commands, the write data values corresponding to the write commands, and the second readout values.

9. The chip design verification method according to claim 8, wherein the write procedure comprises: directly writing the test data sets into the storage space modules of the one-time programmable module.

10. The chip design verification system according to claim 8, wherein the module under test further comprises: a write register module comprising a location register module and a numeral register module; and a trigger register;
the write procedure comprises performing the following steps on each of the test data sets:
writing a current number into the location register module;
writing the location data into the numeral register module;
writing a trigger data into the trigger register so as to write the location data into a first storage space module which is in the storage space modules and corresponds to the current number;
writing a non-trigger data into the trigger register;
adding 1 to the current number and then writing the renewed current number into the location register module;
writing the specific written data into the numeral register module; and
writing the trigger data into the trigger register so as to make the specific written data written into a second storage space module which is in the storage space modules and corresponds to the current number.

11. The chip design verification method according to claim 8, wherein the module under test further comprises an indirect access register module and a status record register module;
the chip design verification method further comprises the following steps:
(a) modifying, by the driver module, a value stored in a test storage space module of the storage space modules in correspondence with an indirect access mode of the module under test;
(b) configuring, by the result verification module, the indirect access register module in correspondence with the indirect access mode so as to enable the indirect access mode of the module under test;
(c) reading, by the result verification module, at least one recorded value of the status record register module; and
(d) comparing, by the result verification module, at least one parameter of the test storage space module corresponding to the indirect access mode with the at least one recorded value so as to determine whether the indirect access mode operates normally.

12. The chip design verification method according to claim 11, wherein the indirect access module is in a repair read mode, and the at least one parameter is the serial number of the test storage space module; the status record register module comprises a first status record register and a second status record register; the aforementioned step (a) comprises:
using the driver module to modify bits stored in the test storage space module in correspondence with the repair read mode to be not all 1's; the aforementioned step (c) comprises: using the result verification module to read a first recorded value of the first status record register and a second recorded value of the second status record register; and the aforementioned step (d) comprises: using the result verification module to compare the serial number of the test storage space module with the first recorded value and verify whether the second recorded value indicates that the one-time programmable module is corrupted so as to determine whether the repair read mode operates normally.

13. The chip design verification method according to claim 11, wherein the chip design verification system further comprises a monitor module, the monitor module comprises an interface module, and the interface module is connected to the module under test through a direct connection;
the chip design verification method further performs the following steps:
in response to that the result verification module configures the indirect access register module in correspondence with the indirect access mode so as to enable the indirect access mode of the module under test, monitoring, by the monitor module, time sequences and electrical potentials of a plurality of second signals which are in the module under test and correspond to the indirect access mode.

14. The chip design verification method according to claim 8, wherein the chip design verification system further comprises a monitor module, the monitor module comprises an interface module, and the interface module is connected to the module under test through a direct connection;
  the chip design verification method further performs the following steps:
  in response to that the module under test performs the autoload function, monitoring, by the monitor module, time sequences and electrical potentials of a plurality of first signals which are in the module under test and correspond to the autoload function.

15. A computer readable recording medium with a stored program, wherein after a processor loads and executes the store program, the computer readable recording medium makes the processor load a module under test file and configure a module under test and a chip design verification system on a logical level; on the logical level, the module under test comprises: a one-time programmable module comprising a plurality of storage space modules, wherein each of the storage space modules has a number; a register module comprising a plurality of registers; and a register controller circuit; the chip design verification system comprises: an agent module comprising a sequencer module and a driver module, wherein the sequencer module is configured to enable a sequence module to generate a plurality of test data sets, and each of the test data sets comprises a location data and a specific written data; and a result verification module coupled to the agent module and the module under test;
  wherein the chip design verification system is configured to perform the following steps:
    transmitting, by the driver module, the test data sets to the result verification module and perform a write procedure so as to write the test data sets into the storage space modules;
    performing, by the module under test, an autoload function so as to load the test data sets stored in the storage space modules into the registers correspondingly; and
    reading, by the result verification module, a plurality of first readout values corresponding to the test data sets at the registers according to the location data of each of the test data sets and compare the test data sets with the first readout values so as to determine whether the autoload function is normal; wherein the chip design verification method further comprises the following steps:
  performing, by the driver module, the write procedure to write the test data sets into the storage space modules of the one-time programmable module, and transmit a plurality of write commands corresponding to the write procedure and a plurality of write data values corresponding to the write commands to the result verification module;
  transmitting, by the driver module, an excitation signal to the register controller circuit to make the module under test to perform a re-autoload function so as to load the test data sets in the storage space modules into the register;
  reading, by the result verification module, a plurality of second readout values corresponding to the write data values at the registers according to the write data values corresponding to the write commands after the module under test enters a steady state; and
  determining, by the result verification module, whether the re-autoload function is normal according to the write commands, the write data values corresponding to the write commands. and the second readout values.

* * * * *